United States Patent [19]

Calfo et al.

[11] 4,281,266
[45] Jul. 28, 1981

[54] DYNAMOELECTRIC MACHINE WITH FLUX SCREEN

[75] Inventors: Raymond M. Calfo, Braddock Hills; Arthur Mulach, Penn Hills; Warren W. Jones, Bullskin, all of Pa.

[73] Assignee: Westinghouse Electric Corp., Pittsburgh, Pa.

[21] Appl. No.: 75,452

[22] Filed: Sep. 14, 1979

[51] Int. Cl.³ .............................................. H02K 1/12
[52] U.S. Cl. ...................................... 310/256; 310/65
[58] Field of Search ................. 310/256, 254, 260, 65, 310/58, 59, 64; 336/84 R, 84 M

[56] References Cited

U.S. PATENT DOCUMENTS

| 1,689,187 | 10/1928 | Pohl | 310/256 |
| 2,795,714 | 6/1957 | Baudry | 310/256 |
| 3,714,477 | 1/1973 | Gott | 310/256 |
| 3,714,483 | 1/1973 | Nurnberg | 310/256 |
| 3,731,127 | 5/1973 | Harrington | 310/254 |
| 3,886,387 | 5/1975 | Graham | 310/256 |
| 4,152,615 | 5/1979 | Calfo | 310/256 |

FOREIGN PATENT DOCUMENTS

| 578381 | 4/1926 | Fed. Rep. of Germany | 310/256 |
| 344775 | 4/1960 | Switzerland | 310/256 |

*Primary Examiner*—R. Skudy
*Attorney, Agent, or Firm*—F. J. Baehr, Jr.

[57] ABSTRACT

Laminated flux screens disposed between finger plates and end plates of a generator to reduce the axial flux striking the end region of the generator core.

9 Claims, 7 Drawing Figures

DYNAMOELECTRIC MACHINE WITH FLUX SCREEN

BACKGROUND OF THE INVENTION

This invention relates to a flux screen for a dynamoelectric machine and more particularly to a flux screen for the end region of a large generator.

The increasing size of large turbine generators has led to higher losses in the ends of the laminated stator core. Unless appropriate design innovations are incorporated into this region, these higher losses will lead to increased temperatures. Normally, these increased temperatures will not adversely affect laminations that have been coated with inorganic insulation. However, these same temperatures in the vicinity of the stator coil can cause a reduction in the life of the stator coil insulation. If not properly controlled by design, this could limit the range of leading power factor operation of large generators.

Historically, end iron heating was resolved in the stator tooth area by splitting the last few inches of core iron and by stepping the tooth end packs. Providing radial cooling ducts in the ends of axially ventilated stator cores has proven to be satisfactory for existing ratings and machine sizes. However, the combination of several slits and radial ducts in the end pack region of the stator has the adverse effect of mechanically weakening the core end structure.

Other schemes had utilized flux shields in the tooth portion of the stator core. These eddy current shields are typically copper plates or loops situated directly in front of the stator teeth. They are conductive members of low magnetic permeability arranged to provide circulating currents which divert stray flux away from the tooth region. For highly rated machines, the currents induced in this type of shield produces extremely high losses, many times higher than that normally seen in the stator end iron. In most cases, liquid cooling of the shields may be required.

Additional losses in the stator core end packs result from axial magnetic flux caused by the rotor and stator end winding currents. Under normal machine operation, the terminal voltage is produced by magnetic flux which travels radially across the air gap and is distributed uniformly over the length of the core. In the end regions, this flux fringes from the ends of the rotor body to the stator end packs. This fringing flux enters the end packs at right angles to the plane of the lamination of the core. The loss generated by the ensuing eddy currents is considerably higher than the losses due to the same flux density entering parallel to the laminations. The net fringing flux is a vector sum of both the rotor and the armature components, varying in magnitude with both load and power factor. This flux continues to penetrate axially into the end pack until it can turn radially and join the peripherally traveling main synchronous flux system. The flux screen hereinafter described assists the fringing flux traveling to the periphery and joining the main synchronous flux system.

SUMMARY OF THE INVENTION

In general, a dynamoelectric machine having a stator and a rotor disposed within this stator with a gap therebetween, when made in accordance with this invention comprises a plurality of laminations forming a core. The core laminations have slots disposed to extend radially outwardly from the radial inner margin. The slots are aligned to form axially extending grooves and teeth. Conductors are disposed in the grooves and extend axially therein and beyond the grooves. The dynamoelectric machine further comprises finger plates having fingers which extend over the teeth and fit between the conductors for transmitting compressive forces to the core laminations including the teeth, end plates disposed outboard of the finger plates for transmitting compressive forces to the finger plates, and flux screens disposed between the end plates and the finger plates. The flux screens are formed of laminations having digital portions which extend radially inwardly over the fingers of the finger plates. The radially inner margins of the flux screen laminations are stepped so as to ascend radially and axially outwardly from the inner margin thereof, whereby the teeth of the core are shielded from fringing flux which would enter the ends of the core region generally perpendicular to the plane of the core laminations.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
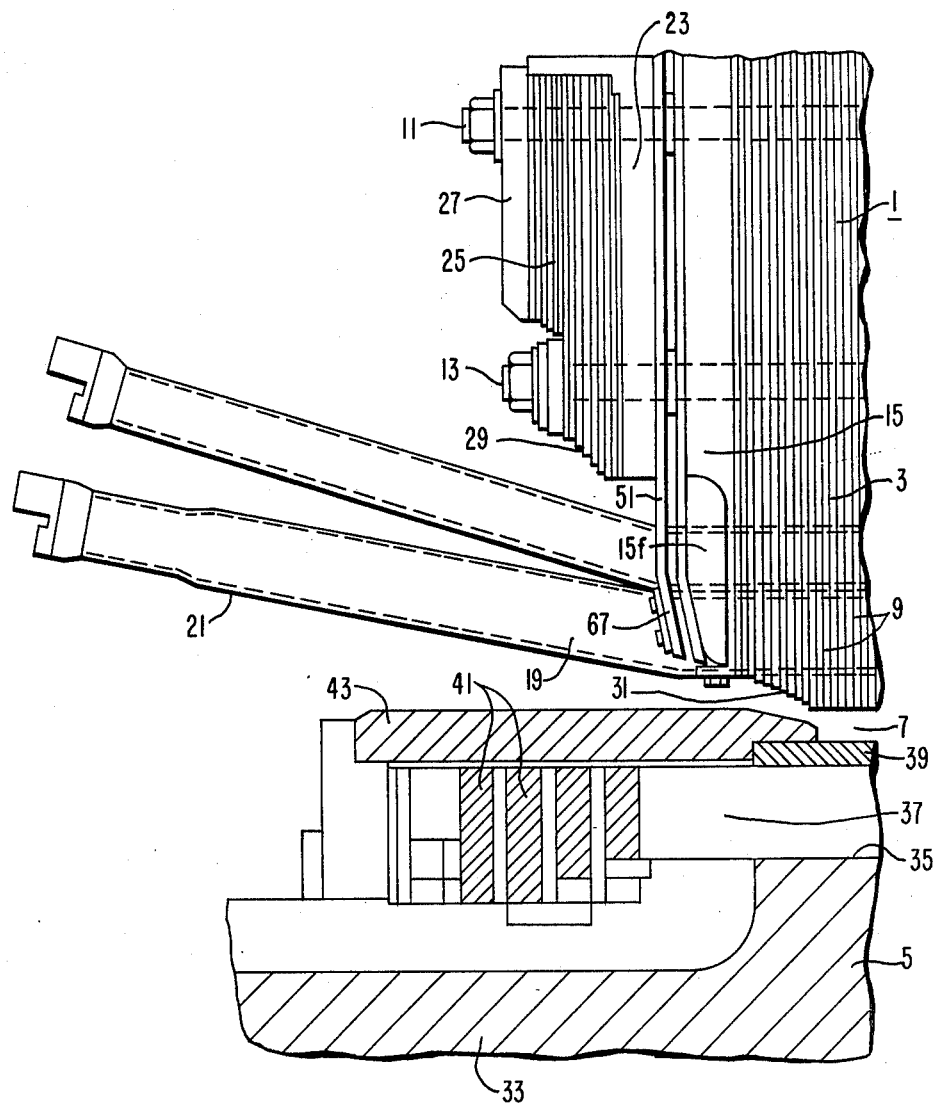
FIG. 1 is a partial sectional view of a dynamoelectric machine made in accordance with this invention.

Referring now to the drawings in detail and in particular to FIG. 1 there is shown the end region of a dynamoelectric machine such as a large generator which comprises a stator 1 having a core 3 and a rotor 5 encircled by the core 3 with a gap 7 disposed therebetween.

The core 3 comprises a plurality of sheets or laminations 9 electrically insulated with a surface coating and stacked on building bolts 11 and firmly clamped together by insulated through bolts 13 which apply pressure through non-magnetic finger plates 15. The core laminations 9 have a plurality of slots disposed to extend radially outwardly from the radially inner margin. The slots are aligned to form an axial groove or slot 17 for conductors 19 which extend axially through the core and therebeyond and are connected at the ends by end turns 21 to form the stator windings. The conductors 19 are held in the slots 17 by slot wedges (not shown) between the slots 17 are portions of the laminations called teeth 22. The finger plates 15 have fingers 15f, which extend over the teeth 22 and fit between the conductors 19 in order to transmit compressive forces to the teeth portions 22 of the lamination 9.

Outboard of the finger plates 15 are end plates 23, end shields 25 and core support ring 27. The end shields 25 are made from a plurality of laminations which are stacked to form steps 29 which ascend radially and axially outwardly as they extend from the core 3.

The end of the core laminations 9 are also disposed to form steps 31, which ascend radially and axially outwardly.

The rotor 5 comprises a shaft 33 having a plurality of axial grooves 35 extending radially inwardly from the outer periphery. Conductors 37 are disposed in the axial grooves 35 and are retained therein by rotor wedges 39. The conductors 37 extend beyond the grooves 35 and are connected by rotor end turns 41 to form the field windings. A retainer ring 43 encircles the rotor end turns 41 to support them against centrifugal forces induced by rotation of the rotor 5.

Figure 2:
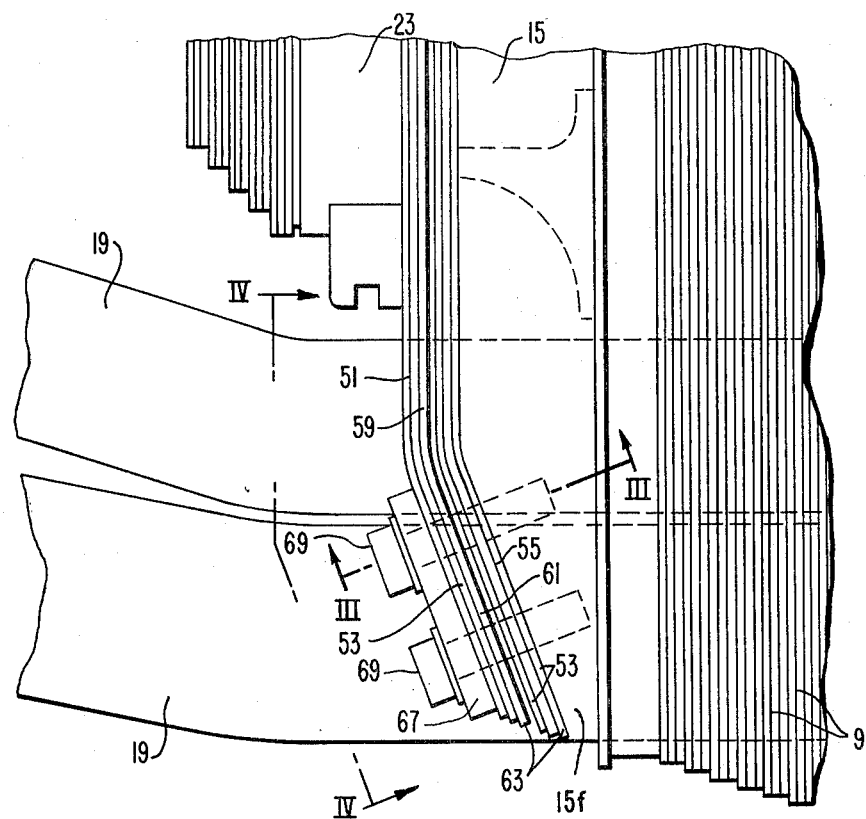
FIG. 2 is an enlarged partial view showing the invention in greater detail.
Figure 3:
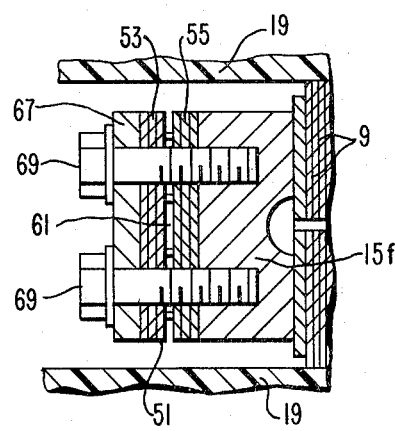
FIG. 3 is a partial sectional view taken on line III—III of FIG. 2.
Figure 4:
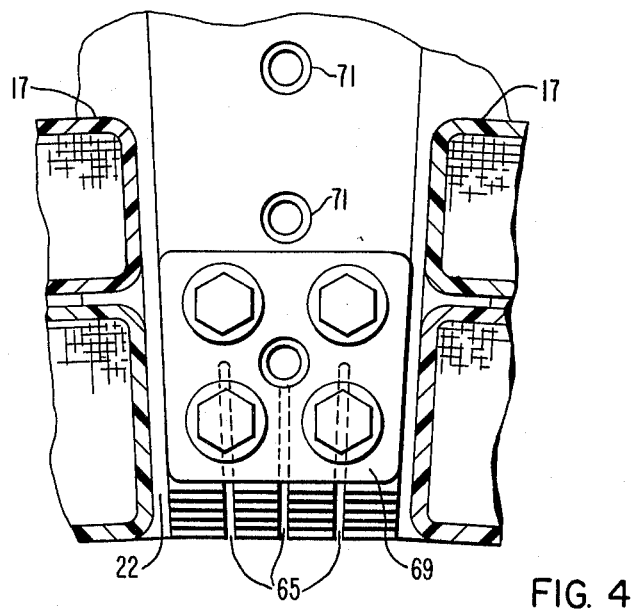
FIG. 4 is a partial sectional view taken on line IV—IV of FIG. 2.

Flux screens 51, as shown in FIGS. 2, 3, and 4 are disposed between the end shields 25 and finger plates 15 and comprise a plurality of laminations 53 disposed in stacks 55 and 57 and having digital portions 59 which extend radially inwardly over the fingers 15f of the finger plates 15 and between the conductors 19. Two stacks 53 and 55 are shown, however, multiple stacks could be utilized with a cooling duct 61 disposed between adjacent stacks. The radially inner end of the digital portions 59 are stacked to form steps 63, which ascend radially and axially outwardly from the radially inner end of the core 3.

The laminations 53 are bent so that at least a portion thereof is bent to form an angle with the plane of the core laminations 9. The bend is such that the laminations 53 generally conform to the outer surface of the finger plates 15. The laminations 53 have at least one and in the embodiment shown have 3 slots 65 which extend radially outwardly from the radially inner margins thereof.

A clamping plate 67 is disposed on the axially outer side of the digital laminations and cooperates with insulated bolts 69 or other fastening means to compress the laminations 53 against the finger plates 15 the latter being drilled and tapped to receive the bolts 69.

Auxiliary vent holes 71 are disposed to align with axial vent holes in the core 9 to improve cooling.

The screen laminations 59 are made of a high permeable magnetic material and are coated with an insulating material so that they are electrically insulated from each other.

Figure 5:
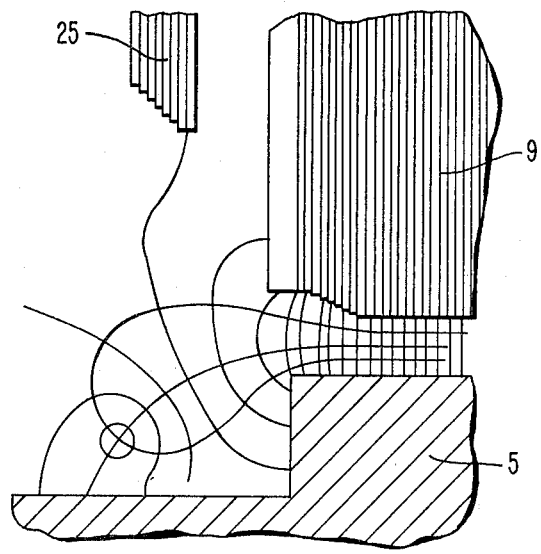
FIG. 5 is a schematic view of the field component of the fringing flux.
Figure 6:
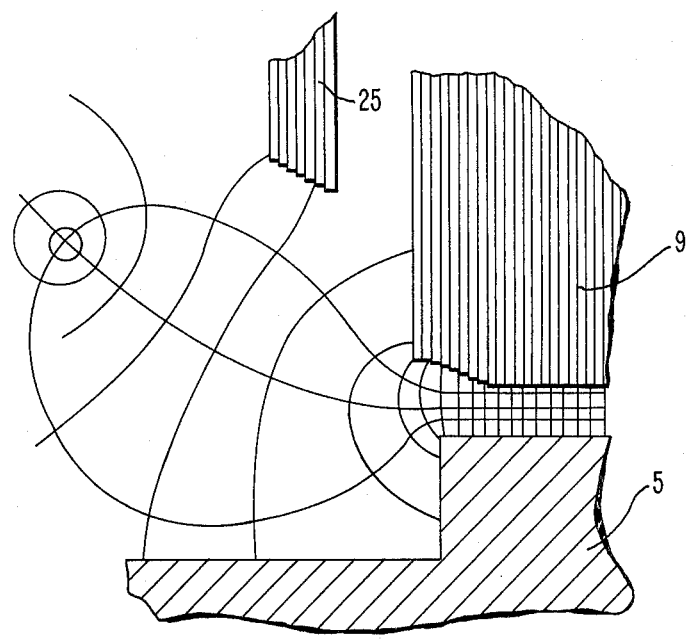
FIG. 6 is a schematic view of the armature component of the fringing flux.
Figure 7:
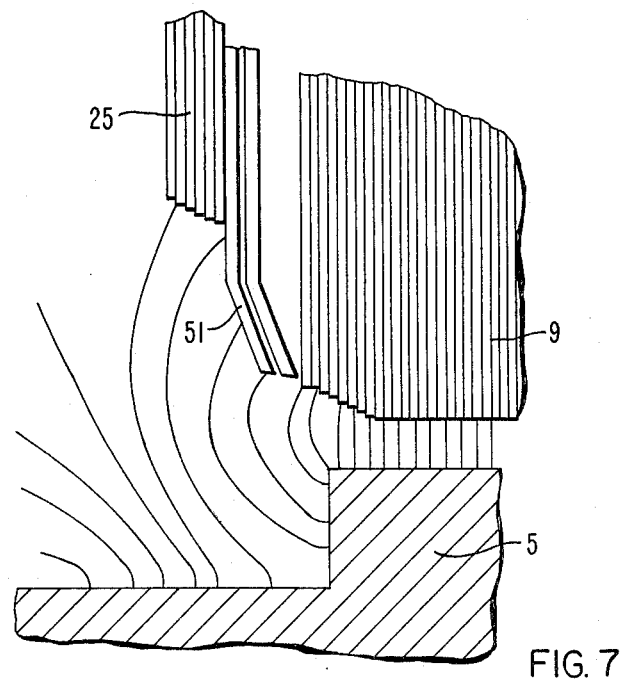
FIG. 7 is a schematic view of the fringing flux with the flux screen in place.

FIGS. 5 and 6 schematically show the fringing flux in the end region of a dynamoelectric machine which does not incorporate flux screen 51 and FIG. 7 schematically shows the fringing flux in the end region in a dynamoelectric machine which incorporates the flux screen 51. The flux screen 51 hereinbefore described minimizes the amount of axial flux which strikes the end of the stator core in the tooth region generally perpendicular to the plan of the stator laminations 9 and simplifies and mechanically improves the stator core construction by reducing the number of slits in the end teeth to a minimum and the axial distance that the teeth are slit is also drastically reduced. The need for radial vent ducts in the end portion of the core can be either reduced or eliminated, thus resulting in a mechanically sound end region.

What is claimed is:

1. A dynamoelectric machine having a stator and a rotor disposed within said stator with a gap therebetween, said stator comprising:

a plurality of laminations forming a core;

said core laminations have slots disposed to extend radially outwardly from the radially inner margin, said slots being aligned to form axially extending grooves and teeth;

conductors disposed in said grooves and extending axially therein and therebeyond;

finger plates having fingers which extend over said teeth and fit between said conductors for transmitting compressive forces to said core laminations including the teeth;

end plates disposed outboard of said finger plates for transmitting compressive forces to said finger plates; and flux screens disposed between said end plates and said finger plates;

each of said flux screens being formed of laminations and having digital portions which extend radially inwardly over said fingers of said finger plates, clamping plates disposed over the digital portions, and fastening means for applying a compressive force to the portion of the screen laminations making up the digital portion, the radially inner margins of said flux screen laminations being stepped so as to ascent radially and axially outwardly from the inner margin thereof, whereby the teeth of the core are shielded from fringing flux which would enter the ends of the core generally perpendicular to the plane of the core laminations.

2. A dynamoelectric machine as set forth in claim 1, wherein the flux screen further comprises a plurality of stacks of laminations, adjacent stacks having a cooling duct disposed therebetween.

3. A dynamoelectric machine as set forth in claim 1, wherein the flux screen further comprises two stacks of laminations with a cooling duct disposed therebetween.

4. A dynamoelectric machine as set forth in claim 2 wherein the radially inner end of the digital portion of the screen laminations are bent axially inwardly.

5. A dynamoelectric machine as set forth in claim 1 wherein the radially inner end of the digital portion of the screen laminations are bent axially inwardly.

6. A dynamoelectric machine as set forth in claim 2 wherein the digital portion of the screen laminations have at least one slot which extends radially outwardly from the radially inner margin thereof.

7. A dynamoelectric machine as set forth in claim 1 wherein the digital portion of the screen laminations have at least one slot which extends radially outwardly from the radially inner margins thereof.

8. The dynamoelectric machine as set forth in claim 1 wherein the fastening means are electrically insulated from the flux screen laminations.

9. A dynamoelectric machine as set forth in claim 8 wherein the fastening means attach to the finger plates.

* * * * *